(12) United States Patent
Laurans et al.

(10) Patent No.: US 12,279,136 B2
(45) Date of Patent: *Apr. 15, 2025

(54) OPERATING WIRELESS DEVICES AND IMAGE DATA SYSTEMS

(71) Applicant: SimpliSafe Inc., Boston, MA (US)

(72) Inventors: Charles Laurans, Brookline, MA (US);
Rahul Subramany, Boston, MA (US);
Darrell Andrew Holigan, Winchester, MA (US); Michael E. Noonan, Sandwich, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,856

(22) Filed: Sep. 26, 2023

(65) Prior Publication Data
US 2024/0022928 A1    Jan. 18, 2024

Related U.S. Application Data

(63) Continuation of application No. 17/321,600, filed on May 17, 2021, now Pat. No. 11,818,595.
(Continued)

(51) Int. Cl.
*H04W 24/04* (2009.01)
*H04N 7/12* (2006.01)
(Continued)

(52) U.S. Cl.
CPC .............. *H04W 24/04* (2013.01); *H04N 7/12* (2013.01); *H04N 7/183* (2013.01); *H04N 23/53* (2023.01);
(Continued)

(58) Field of Classification Search
CPC .. H04N 7/12; H04N 5/23219; H04N 5/23206; H04N 5/22525; H04W 76/10; H04W 76/04
See application file for complete search history.

(56) References Cited

U.S. PATENT DOCUMENTS

| | | |
|---|---|---|
| 4,901,096 A | 2/1990 | Lemelson |
| 5,241,542 A | 8/1993 | Natarajan et al. |

(Continued)

FOREIGN PATENT DOCUMENTS

| | | |
|---|---|---|
| CA | 2157742 C | 7/1999 |
| CN | 106210625 B | 4/2019 |

(Continued)

OTHER PUBLICATIONS

Invitation to Pay Additional Fees for International Application No. PCT/US2021/032494, mailed Jul. 26, 2021.
(Continued)

*Primary Examiner* — On S Mung
(74) *Attorney, Agent, or Firm* — Finch & Maloney PLLC

(57) ABSTRACT

A location monitoring system, such as an alarm system employed at a house or other location, can include a wireless, battery-operated camera. The camera can have a low power mode in which all components other than a low power communications module are deactivated. The camera can be activated by a signal received by the low power communications module, and the camera can establish a direct communications link with, and send video image data to, a remote server. Where the camera/server direct communications link is inoperable, a link to a local controller is established, and at least a portion of the video image data sent to the controller, which can send a portion of the video image data via an alternate network.

20 Claims, 4 Drawing Sheets

Related U.S. Application Data

(60) Provisional application No. 63/026,412, filed on May 18, 2020.

(51) Int. Cl.
    *H04N 7/18*         (2006.01)
    *H04N 23/53*       (2023.01)
    *H04N 23/611*     (2023.01)
    *H04N 23/661*     (2023.01)
    *H04W 52/02*      (2009.01)
    *H04W 76/10*      (2018.01)
    *H04W 84/12*      (2009.01)

(52) U.S. Cl.
    CPC ......... *H04N 23/611* (2023.01); *H04N 23/661* (2023.01); *H04W 52/0209* (2013.01); *H04W 76/10* (2018.02); *H04W 84/12* (2013.01)

(56) References Cited

U.S. PATENT DOCUMENTS

| | | |
|---|---|---|
| 5,323,302 A | 6/1994 | Bertling et al. |
| D349,714 S | 8/1994 | Hasegawa |
| 5,825,413 A | 10/1998 | Mullis |
| 5,959,622 A | 9/1999 | Greer et al. |
| D500,511 S | 1/2005 | Sybilrud |
| 7,471,334 B1 | 12/2008 | Stenger |
| 7,507,946 B2 | 3/2009 | Goldberg et al. |
| 7,609,952 B2 | 10/2009 | Jezierski et al. |
| D624,577 S | 9/2010 | Kujawski et al. |
| 7,873,266 B2 | 1/2011 | Schnell |
| 7,928,842 B2 | 4/2011 | Jezierski et al. |
| 8,085,342 B2 | 12/2011 | Agan et al. |
| D659,871 S | 5/2012 | Lee et al. |
| 8,675,066 B2 | 3/2014 | Trundle et al. |
| 9,153,111 B2 | 10/2015 | Trundle et al. |
| 9,282,297 B2 | 3/2016 | Siann et al. |
| 9,611,978 B2 | 4/2017 | Manniche et al. |
| D797,176 S | 9/2017 | Lin et al. |
| 9,773,601 B2 | 9/2017 | Breiwa et al. |
| D832,329 S | 10/2018 | Li |
| 10,326,965 B2 | 6/2019 | Siann et al. |
| 11,425,582 B2 | 8/2022 | Laurans et al. |
| 2004/0212678 A1 | 10/2004 | Cooper et al. |
| 2005/0212912 A1 | 9/2005 | Huster |
| 2007/0120970 A1 | 5/2007 | Goffin |
| 2013/0147962 A1 | 6/2013 | Siann et al. |
| 2016/0034750 A1 | 2/2016 | Bishop et al. |
| 2016/0132099 A1 | 5/2016 | Grabau et al. |
| 2017/0347133 A1 | 11/2017 | Wang et al. |
| 2019/0347916 A1 | 11/2019 | Wild et al. |
| 2022/0353708 A1 | 11/2022 | Laurans et al. |

FOREIGN PATENT DOCUMENTS

| | | |
|---|---|---|
| EP | 4154522 A1 | 3/2023 |
| WO | 2021236450 A1 | 11/2021 |

OTHER PUBLICATIONS

International Search Report and Written Opinion for International Application No. PCT/US2021/032494, mailed Sep. 21, 2021.
Examiner's Report; CA Application No. 3,178,890; Mailing Date: Mar. 19, 2024 (3 pgs).
Examination Report; EP Application No. 21730416.1; Mailing Date: Jul. 30, 2024 (7 Pgs).

OPERATING WIRELESS DEVICES AND IMAGE DATA SYSTEMS

CROSS-REFERENCE TO RELATED APPLICATIONS

This application is a continuation of and claims priority to U.S. patent application Ser. No. 17/321,600, filed May 17, 2021, and published as U.S. Patent Application Publication No. 20210360446, which claims priority to U.S. Provisional Application No. 63/026,412 filed May 18, 2020, each of which is herein incorporated by reference in its entirety.

TECHNICAL FIELD

This application relates to operating wireless devices and related image data systems, e.g., for use with security or other premises monitoring systems.

BACKGROUND

Cameras, including wireless cameras that can send video data without a wire or other physical connection, are known for use in a variety of different applications, such as with security systems. Such cameras can be used to record image data from areas of interest, such as near the front door of a house or other locations in and/or near a building or other monitored space. Some such cameras can be battery-powered, easing installation and increasing the range of locations that the cameras can be deployed.

SUMMARY OF INVENTION

In some aspects, a location monitoring system, such as an alarm system having sensors and other components at a building or other location to detect and report alarm conditions, can include a camera arranged to capture video image data and to send the video image data to a remote server at a location remote from the camera. This can allow the server to send the video image data to a user device (such as a smartphone) so the user can review the video image data, e.g., so the user can determine whether a person at the monitored location is known to the user or not or otherwise assess conditions at the location. The camera can include a first communications module arranged to send the video image data to the remote server via a first communications network having a first minimum bandwidth. As an example, the first communications module can be a wifi communications module that the camera uses to send the video image data to the server. The first communications network between the camera and the server can allow the camera to send the video image data directly to the server, meaning that video image data need not be routed through a base station or other controller that controls operations of an alarm system at the location, as an example. Thus, the camera can send the video image data to the server via the first communications network, which can include a wifi network, the Internet and other networks, without involving other devices at the monitored location.

The camera can include a second communications module arranged to communicate via a second communications network. The second communications module can be a sub-GHz protocol module that allows the camera to communicate using a sub-GHz protocol network, or can be a module that employs a communications protocol, frequency or other network features that are different from the first communications module. The camera can use the second communications module to communicate with devices local to the camera at the monitored location, such as a base station that is arranged to communicate with the camera. The base station can be arranged to communicate with the remote server via the first communications network, e.g., a network that includes a wifi network, the Internet and other networks, and a third communications network, e.g., a network that includes a cellular network. Thus, the base station can communicate with the server via at least two different networks. In some cases, the third communications network has a maximum bandwidth that is smaller than the first minimum bandwidth, e.g., a network between the base station and server that includes a cellular network can have a smaller maximum bandwidth than a minimum bandwidth of a network between the camera and server.

The camera and the base station can be adapted such that when a communications link between the camera and the remote server using the first communications network is inoperable, a communications link between the camera and the base station is established and at least a portion of the video image data is sent from the camera to the base station. The base station can then send the video image data, or a portion of it, from the base station to the remote server via the third communications network. This operation can allow the system to overcome disruptions in the communications network between the camera and the server, e.g., a failure of a wifi connection between the camera and server, which can allow a user to still receive at least some video image data to assess conditions at the monitored location. This can enhance security at the monitored location because at least some image data can be sent from the location to the server and/or a user even in the case of communication network disruption. The enhanced security can be provided at relatively low cost as well, because only a portion of the video image data need be sent over a higher cost network (such as cellular) and/or because a low cost network such as sub-GHz can be employed at least in part.

When the first communications network between the camera and the server is inoperable, e.g., a connection at some point in the network fails or a data transmission rate falls below a threshold, video image data can be sent from the camera to the base station in different ways. In some embodiments, the first communications module of the camera can be adapted to send at least a portion of the video image data to the base station, and the base station can be adapted to send at least a portion of the video image data to the remote server via the third communications network. As an example, the first communications module can be a wifi module and a wifi network can be established between the camera and base station for sending video image data. In some cases, the base station can be configured to send a wifi signal to establish a connection between the camera and the base station that uses the first communication module of the camera. The base station can act as a wifi access point for the first communications module of the camera, allowing the camera to send video image data to the base station using a wifi connection. In some embodiments, the second communications module of the camera can be adapted to send at least a portion of the video image data to the base station when the first communications network between the camera and server is inoperable. The second communications module can be a low power device, and may operate using significantly lower power than the first communications module. This can allow the first communications module to enter a sleep or low power mode, and the second communications module can be adapted to communicate with the base station when the first communications module is in the sleep mode. As a result, if the camera is battery powered, the camera can conserve battery power by disabling or deactivating the first communications module (and other camera components) while the second communications module remains active and capable of sending video image data to (or sending/receiving other communications with) the base station. Alternately, or in addition, this feature can allow the camera to avoid creating interfering communications using the first communications module, and instead use the second communications module. In some cases, the second communications module can be a sub-GHz communications module that communicates with the base station using sub-GHz communications network or other link.

In some embodiments, the camera and/or base station can be adapted to send only a portion of video data to the base station and/or to the server. For example, the camera can capture video data that includes multiple image frames, audio data, etc. and this video data (which may support a live video stream) can have a large bit size. While the first communications module can be adapted to support the sending of large file size video data to the server, the second communications module may not, or a network connection between the camera and the base station using the first communications module (e.g., where the base station operates as a wifi access point for the camera) may not. In some cases, the camera can be adapted to select one or more image frames from video image data, and send only a selected image frame(s) to the base station. The base station can send the selected image frame(s) to the server, using the third communications network (e.g., including a cellular network), or can itself select one or more image frames from the video image data received from the camera for sending to the server. In some cases, the camera and/or base station can be adapted to select one or more image frames (e.g., one or more still images) based on analysis of the video image data. Such analysis can include artificial intelligence or other processes to identify image frames of interest, such as one or more frames that include a visible face, a recognizable or recognized face, a pet, an object, etc.

In some aspects, a method of redirecting video data from a battery-operated camera system to a server via a local host base station includes determining that a first network between a camera and a server is inoperable such that image data cannot be sent directly from the camera to the server without routing the image data through the local host base station. As described above, this can involve determining that a wifi connection between a camera and a gateway to an Internet connection has failed or degraded, and/or that an Internet connection between the gateway and server has failed or degraded, etc. This determination can be made by the camera, the server, or other component. When this occurs, a message can be sent to the base station to operate the camera system in a back-up cellular mode. This message can be sent from the camera, server or user to the base station, which can be arranged to operate as a controller for a local alarm system. A communications link can be established between the camera and the base station, e.g., to send the message from the camera to the base station to operate in back-up cellular mode and/or for sending video image data from the camera to the base station. The communications link can be, for example, a wifi connection where the base station acts as a wifi access point for the camera, a sub-GHz communications link or other suitable communications link. At least a portion of the image data can be sent from the camera to the base station via the communications link between the camera and the base station, e.g., the camera can send all of the video data it has recorded over a period of time or can send only selected images or other portions of the video image data (such as a sound bite). At least a portion of the image data can be sent to the server via a cellular connection between the base station and the server, and the image data sent can be all of the image data sent from the camera to the base station, or the base station can select one or more image frames or other part of the image data for sending to the server.

In some aspects, a method of operating a camera system includes determining that a first network for sending image data between a camera and a server is inoperable. As described above, this can involve determining that a wifi connection between a camera and a gateway to an Internet connection has failed or degraded, and/or that an Internet connection between the gateway and server has failed or degraded, etc. This determination can be made by the camera, the server, or other component. A message can be received, at a base station, to operate the camera system in a back-up cellular mode. This message can be sent from the camera, server or user to the base station, which can be arranged to operate as a controller for a local alarm system. A communications link can be established between the camera and the base station. The communications link can be, for example, a wifi connection where the base station acts as a wifi access point for the camera, a sub-GHz communications link or other suitable communications link. At least a portion of the image data can be received, at the base station, from the camera via the communications link between the camera and the base station, and at least a portion of the image data sent to the server via a cellular connection between the base station and the server.

When operable, the first network can be arranged for sending video image data from the camera to the server without routing the video image data through the base station. For example, the camera can have a wifi connection to a gateway, which can have an Internet or other connection to the server, and this network can be used to send the video image data. In some cases, the cellular connection between the base station and the server is established in response to determining that the first network between the camera and the server is inoperable. Portions of the image data, which can include a plurality of image frames, can be selected based on analysis of the image data and one or more selected image frames or other video image data portions can be received by the base station and sent to the server.

In some aspects, a method of controlling a system camera includes establishing a first communication network between a controller of the system and a camera device of the system. The controller can be a base station or other device that operates to control functions of an alarm system at a monitored location, and the first communication network can be any suitable communications link, such as a wifi connection, a sub-GHz communications link, or other. A signal can be received, e.g., at the camera and/or the controller, indicating activity within an area of interest of the camera device. The signal can be received at the camera and/or at the controller in response to a sensor that is part of the camera, or remote from the camera (e.g., a sensor that is part of an alarm system or other monitoring system), detecting motion, the presence of people or objects, a sound (breaking glass), or other condition that triggers a desire to record video image data at the camera. In some embodiments, the signal can be received at the camera and/or base station in response to a user indicating a desire to receive image data, e.g., by the user activating an app associated with the user's alarm system, by the user specifically requesting to see an image from a monitored location, etc. A signal can be sent to the camera device to cause the camera device to establish a second communication network between the camera device and a server system, e.g., to establish a wifi connection to a gateway which has an Internet connection to the server. This can allow the camera to send video image data directly to the server without routing through the controller. A signal can be sent to the camera device to cause the camera device to begin recording image or audio data from the area of interest. This signal can be internal to the camera or received at the camera, e.g., from the base station, user or server, and cause image or audio data to be recorded and sent to the server via the established second communication network. While the systems and methods herein are generally described for capturing and transmitting image or video data, other embodiments are possible where the techniques, devices, and methods are used to capture and transmit audio data.

In some cases, the signals sent to the camera to establish the second communications network and to record (and send) image data can be sent from the controller to the camera using the first communication network and while components of the camera including a second communications module and imaging module are in a sleep or low power mode. For example, the camera can be battery powered and normally have most of its components deactivated in a low power or sleep mode so as to reduce power consumption and extend battery life or time between charges. The camera can have only a selected group of components, e.g., that are part of an always on circuit, that are activated during the low power mode, and such components can include a first communications module and/or a motion detector. This can allow the camera to always be capable of receiving communications from the controller or elsewhere via the first communication network and/or detect motion or other conditions that cause the camera to activate the camera module and second communications module to record and send the video image data. As an example, the first communications network can be a sub-GHz network or other communications protocol that enables use of a low power communications module at the camera that is part of the always on circuit. The second communications network can be a wifi network that requires use of a wifi module, which can have a larger power requirement than the sub-GHz module. As a result, the camera can be normally in a sleep or low power mode and be activated at any time based on conditions or actions detected at any location to record and send image data. Moreover, if the second communications network is discovered to be inoperable, either during or before any image data is sent to the server, the camera can send at least a portion of the image data to the controller for forwarding by the controller to the server, e.g., via a network that includes a cellular or other network. This can provide a long life battery operated camera with an image send back up function that can enhance security at a monitored location.

In some embodiments, when the camera is activated to record image data, it may do so for a pre-determined period of time, such as 2-5 minutes, and/or during a time period that motion or other conditions (e.g., activity at an area of interest) are sensed at the monitored location. Sensed conditions can be detected by a sensor that is part of the camera and/or by other remote sensors at the monitored location. For example, in some embodiments the controller is a base station of an alarm system and the signal indicating activity includes a signal from a sensor of the alarm system while the base station is in an armed state. When the base station is in an armed state, conditions sensed by one or more sensors may cause the base station to determine an alarm state, and can cause the base station to send a signal to the camera device to cause the camera device to begin recording image data immediately upon receipt of the signal indicating activity.

In some aspects, a method of operating a system camera connected to a local device network includes establishing a first communication network between a controller of the system and a camera device of the system. The controller can be a base station or other device that operates to control functions of an alarm system at a monitored location, and the first communication network can be a sub-GHz communications link, or other low power communications protocol. This can enable the camera to operate a first communication network device (e.g., a sub-GHz communication module) that has relatively low power requirements, enabling the camera to conserve battery power. A second communication network device of the camera such as a wifi communications module can be maintained in a disabled state, e.g., as part of a sleep or low power mode of the camera where only components of an always on circuit are activated and/or powered. A first communications network device (e.g., sub-GHz module) can be part of the always on circuit. An activation signal can be received from the controller, at the camera device and via the first communication network, based on a received signal at the controller indicating activity within an area of interest of the camera device. As an example, the controller can receive a signal from one or more sensors at a monitored location that motion, noise or other conditions are occurring and the controller can send a signal to the camera via the first communications network (e.g., the sub-GHz link) that activity within an area of interest is occurring. Alternately, or in addition, the controller can receive a signal from a user (e.g., in response to the user activating an app, acknowledging a notification from the controller, or other request from the user) that image data is to be recorded by the camera, and the controller can send the activation signal to the camera. In response, the second communication network device can be activated by the camera to establish a second communication network between the camera device and a server system, e.g., the camera controller can activate a wifi module to establish a wifi connection to a gateway and so establish a network connection to the server system. An imaging device of the camera can be turned on or otherwise activated to capture image data of the area of interest in response to the activation signal. This image data or at least a portion of it can be sent to the server via the second communication network. The image data can be sent from the camera to the server system via the second communications network and without routing the image data through the controller. This can free the controller for other activities, such as managing operation of components of an alarm system.

If the second communications network is discovered to be inoperable, either during or before any image data is sent to the server, the camera can sent at least a portion of the image data to the controller for forwarding by the controller to the server, e.g., via a network that includes a cellular or other network. The image data can be sent from the camera to the controller via the first communications network, or via a network that uses the same protocol as the second communications network, e.g., a wifi connection where the controller operates as a wifi access point for the camera.

In some embodiments, when the camera is activated to record image data, it may do so for a pre-determined period of time, such as 2-5 minutes, and/or during a time period that motion or other conditions (e.g., activity at an area of interest) are sensed at the monitored location. Sensed conditions can be detected by a sensor that is part of the camera and/or by other remote sensors at the monitored location. For example, in some embodiments the controller is a base station of an alarm system and the signal indicating activity includes a signal from a sensor of the alarm system while the base station is in an armed state. When the base station is in an armed state, conditions sensed by one or more sensors may cause the base station to determine an alarm state, and can cause the base station to send a signal to the camera device to cause the camera device to begin recording image data immediately upon receipt of the signal indicating activity.

Other advantages and novel features will become apparent from the following detailed description of various non-limiting embodiments when considered in conjunction with the accompanying figures and claims.

BRIEF DESCRIPTION OF THE DRAWINGS

Aspects of the systems and methods described herein are described with reference to the following drawings in which numerals reference like elements, and wherein.

DETAILED DESCRIPTION

Figure 1:
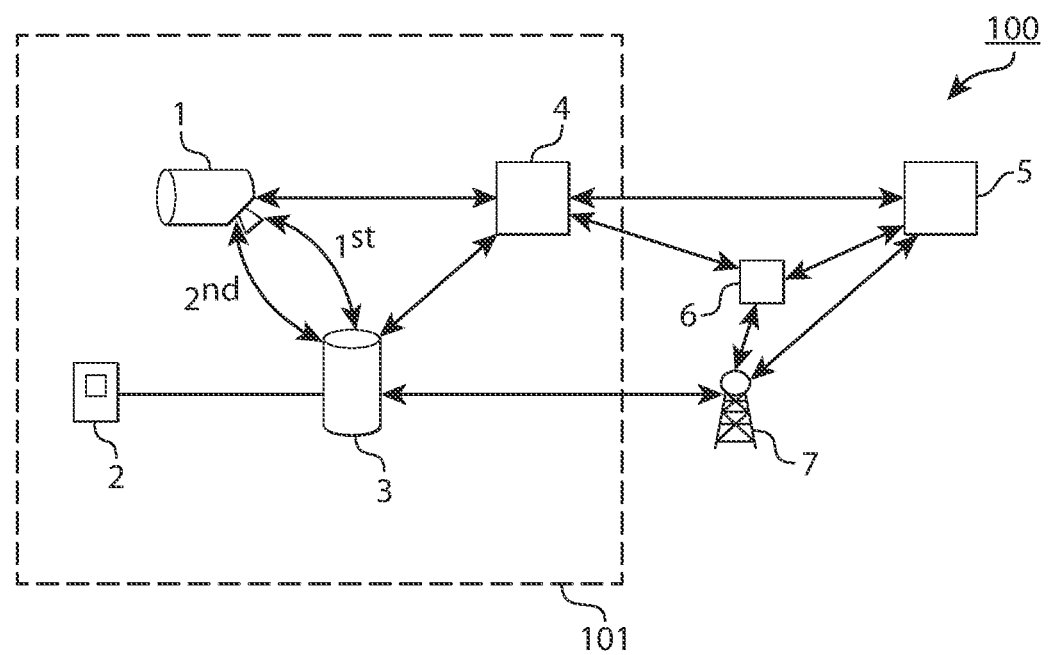
FIG. 1 is a schematic diagram of a security system incorporating a wireless camera and adapted to manage video image data.

Aspects of the systems and methods described herein are described below by way of one or more illustrative embodiments. It should be understood that the illustrative embodiments described are not intended to limit the aspects, but rather to help show how one or more aspects can be implemented in a particular example. Also, aspects can be implemented alone and/or in combination with other aspects. For example, some aspects below relate to a camera that can communicate with a remote server via a first network connection to send image data to the server and then adjust to send image data to the server via a base station and another network connection, whereas other aspects relate to a camera that operates only a low power communications module during a low power mode and upon receipt of a signal by the low power communications module, activates both an imager to record image data and a higher power communications module to send the image data. These aspects and others can be employed together, individually and/or in any suitable sub combination with each other.

In some aspects, a location monitoring system such as a home security system includes a camera arranged to capture video image data and to send the video image data to a remote server, which can perform a security monitoring function to identify alarm states, notify authorities of an alarm condition at a monitored location and/or allow a user to interact with the camera and other sensors or components at the monitored location. For example, a user can interact with the remote server using a smartphone application or other user interface to view image data provided by the camera, control the camera to start or stop image recording, send or receive audio communications (e.g., to allow the user to talk with a person at the monitored location), etc. The systems and methods described herein typically include two different techniques for communicating with external devices, which as described below can each be utilized in a variety of ways to increase camera performance in several ways, including increased battery life, increased reliability, or more efficient (e.g., less expensive) data transfer methods when operating over cellular device networks. To do so, as described, the camera typically has two different communications modules, each having different characteristics and capabilities, such as a high bandwidth module and a low bandwidth module. In some cases, the high bandwidth module may require two-way communications between devices to operate, whereas the low bandwidth module can operate properly using only one-way communication.

For example, the camera can have a first communications module, such as a wifi communications module, arranged to send the video image data to the remote server via a first communications network connection. The first communications network connection can include a wifi connection from the camera to a router or gateway local to the camera, and a broadband/Internet connection from the router or gateway to the remote server. Thus, the first communications network connection can have a first minimum bandwidth that is relatively high, providing a relatively high speed connection between the camera and the server. This can allow the camera to send live video data to the server, which can then be sent to a user, without significant time delay or disruption to the video quality. The first communications network can allow the camera to send the video data to the remote server directly, meaning without routing the image data through a base station or other monitoring system components local to the monitored location. This can free a base station or other local controller at the monitored location for other tasks, such as monitoring sensor data, detecting the presence of alarm conditions, and so on.

The camera can also have a second communications module arranged to communicate via a second communications network connection with monitoring system components that are local to the camera. As an example, the camera can use the second communications module to communicate with a local base station that controls operation of the local system components and communicates with the remote server, e.g., to send notifications regarding alarm conditions at the monitored location, to allow a user to receive data from system sensors or other components, to allow a user to adjust system operation, and so on. The base station can be arranged to communicate with the remote server via the first communications network, e.g., a wifi connection to a local router/gateway and broadband/Internet connection, as well as a third communications network, such as a cellular network. Normally, the base station can employ the first communications network (or a network that operates similar to the first communications network (e.g., another wifi network or a wired ethernet connection)) to communicate with the server, e.g., because of the relatively fast data transfer provided, but can switch to use of the third communications network when there are problems with the first communications network. Note that communication between the base station and the server using the first communications network is not routed through the camera, but rather is direct between the base station and the server.

When a communications link between the camera and the remote server using the first communications network to send image data is inoperable, e.g., when an Internet connection between the camera and remote server operates so as to send data below a threshold rate or fails entirely to send data (such as due to a failed or otherwise not sufficiently operable (e.g., too low bandwidth) wifi connection), the camera and base station can operate together to send at least a portion of the video image or audio data to the server. This can allow, for example, a user to get at least some image data, e.g., one or more still image frames selected from the video image data and/or at least some audio information that is part of the video image data, even when the first network connection between the camera and the remote server is not operating suitably. (As used herein, video image data refers to data that includes image data only, or data that includes image data and audio data.) When this occurs, a communications link between the camera and the base station can be established and at least a portion of the video image data sent from the camera to the base station.

The communications link between the camera and the base station can be established in different ways. For example, if the camera detects a poor or failed connection to the server, the camera can request the base station to act as a wifi access point so the camera can send video data to the base station via a wifi connection. Alternately, the base station can receive a signal from the remote server, user or other device indicating that the connection between the camera and remote server is not operating suitably and that the base station should operate as a wifi access point. As another alternative, the camera and base station can establish a communications link using a different communications protocol and/or devices than wifi, such as a low power consumption (and low bandwidth) communications protocol, such as a sub-GHz communications protocol, and can do so at the initiation of the camera, server or other component of the monitoring system.

As discussed more below, in addition to addressing loss of wifi (or other first communications networks), the camera can include the sub-GHz communications or other low power communications module that operates during a low power mode of the camera when all other components of the camera are disabled. The sub-GHz communications module can operate to receive a wake up signal and cause the camera to operate to capture and send video image data directly to the remote server via the first network connection. Sending and/or receipt of the wake-up signal can be triggered in various ways, such as based on information from a sensor at the monitored location (e.g., a motion sensor detects motion near the camera), based on a user requesting video from the camera, based on a detected alarm condition, or other conditions. As detailed below, by operating the camera in such a manner when a certain set of components (e.g., relatively higher power consumption components, such as the imager, flash lights, certain sensors) are not necessarily always on, significant power usage savings can be achieved. In some cases, the low power (sub-GHz communications link) and a select few other components (e.g., a motion detector (e.g., a non-imager based detector (e.g., an infrared sensor))) can be "always on," so that the camera remains in communications with the base station, but in a significantly reduced power state and, upon notification over the low power link or from an internal sensor, the rest of the camera, such as the imager and internal image processing equipment, can be quickly turned on for use. As a result, the camera can typically consume less power than other systems that may rely solely on one such connection (wifi or other high bandwidth protocol) for interacting with other related devices.

In some cases, the sub-GHz communications module or other low power communications module can also be used to send video image data from the camera to the base station, such as when the first network connection between the camera and server is inoperable. Image data received by the base station from the camera can be sent to the remote server using any suitable network connection, such as a connection including a cellular network, an Internet connection, a wifi connection, etc. This alternate network connection between the base station and the server can have a maximum bandwidth that is smaller, in some cases significantly smaller, than the bandwidth of the connection between the camera and server using the first communications network. Thus, live video may not be enabled between the camera and the server (and/or between the camera and a user in communication with the server), but one or more still images can be relayed by the base station to the server. In some embodiments, the one or more still images can be selected by image analysis of video data captured by the camera. For example, the camera can include an image analysis module that analyzes the image data to select an image frame that includes a recognizable, or recognized, human face, pet or other animal, sound, etc., and the selected image frame can be sent to the base station, and then to the server. As a result of providing smaller image or audio data, the resulting size of information sent over a cellular connection can also be reduced, which can decrease cellular data consumption and cost.

FIG. 1 shows a schematic diagram of an example location monitoring system 100. The system 100 is arranged to monitor a location 101, which can be an apartment, a room in a larger building, a building, an outdoor space (such as a playground), etc. Monitoring of the location 101 can involve any variety of different functions, such as detecting and analyzing conditions, such as use of doors to enter/exit a building, opening/closing of windows, noise at the location, fire and/or smoke conditions, movement of people or objects, abnormally high/low temperatures and/or water, etc. (As used herein, a condition "at" a location such as a building refers to the condition being within and/or near the location, e.g., movement of persons "at" a building refers to movement of persons within and/or near the building.) In some embodiments, the monitoring system 100 is a security system for a home or apartment and can monitor for the presence of people, sounds, door/window opening, etc., as well as perform functions of identifying whether an alarm condition is present, and taking particular actions in response to sensed conditions, such as notifying authorities (e.g., police, fire, building management, etc.) of particular conditions, notifying a user of particular conditions, displaying an alarm (e.g., emitting siren noises and emergency lighting at the building, etc.), recording video and/or audio conditions at the building, and so on. Thus, although the monitoring system can be referred to herein as an "alarm" system, the alarm system need not necessarily display alarm sounds or lights at the location, but instead can be employed only for monitoring conditions at the location and optionally reporting on monitored conditions.

Multiple monitoring system 100 components can be local to the location 101, i.e., physically positioned at the location 101, whereas other components can be positioned remote from the location 101. In this embodiment, components that are at the location 101 include a camera 1, one or more other sensors 2, and a base station 3 or local controller, which can all be part of a security system installed at the location 101. A wifi access point, router and/or other gateway 4 to an Internet or other wide area network connection (such as a broadband modem) can have one or more components at the location 101 (such as a wifi router) and/or one or more remote components (such as a satellite-based wifi component). The gateway 4 provides a network connection for the camera 1 and the base station 3 to the Internet or other wide area network, and so can provide a communications link to remote components of the system 100. Remote components can include a server 5, which can include multiple servers in distributed locations and/or other data processing and storage devices. The server 5 can provide various monitoring functions such as receiving data from the camera 1, sensors 2 and/or base station 3, controlling operation of the local components at the location 101 (including the base station 3), analyzing data from the base station 3 and other local components to assess whether an alarm condition is present or to assess other location conditions, notifying authorities (such as police or fire) regarding conditions at the location 101 which may need attention, etc. The server 5 can also provide information regarding the location 101 to, and receive instructions from, a user device 6 (often referred to herein more simply as a user, and can include a smartphone, computer, or other data processing device along with a suitable user interface to provide output (e.g., information display) and receive input (e.g., user commands)). In addition to being able to communicate with the server 5 via a network connection that includes the gateway 4, the base station 3 can communicate with the server 5 via a network that includes a cellular network 7. The cellular network 7 can be employed, for example, when the gateway-based network is not operable.

The camera 1 can communicate directly with the server 5 via a first network that includes a wifi connection with the gateway 4 and an Internet or other wide area network connection between the gateway 4 and the server 5. Thus, the camera 1 can record and send video image data directly to the server 5 without routing the image data through the base station 3 or other components between the camera 1 and the gateway 4. The camera 1 can also communicate with the base station 3 in at least two ways: 1) via a wifi connection between the camera 1 and the base station 3 when the base station 3 acts as a wifi access point, and 2) a sub-GHz communication network or link between the camera 1 and the base station 3. (The camera 1 can also be capable of communicating with the base station 3 using the wifi network in which the gateway 4 or other device in communication with the gateway 4 (e.g., a wifi router) acts as the wifi access point for both the camera 1 and the base station 3.) As discussed in more detail below, the sub-GHz communication link can be employed when the camera 1 is in a low power mode to conserve battery power in which all components of the camera 1 are disabled other than the sub-GHz communication module and other components necessary to support the sub-GHz communication module. Since the sub-GHz communication module can operate on very low power requirements, the camera 1 can be contacted by the base station 3 when the camera is nearly entirely deactivated in low power mode, e.g., to cause the camera 1 to activate an imaging device to record image data of an area of interest and send that data directly to the server 5. Moreover, if the location 101 has multiple cameras 1, all of the cameras 1 can be activated to record image data in response to a single signal sent from the base station 3 on the sub-GHz protocol. This is because the sub-GHz activation signal need not necessarily be acknowledged by every camera 1 to cause activation of the camera 1.

Similar to the camera 1, the base station 3 can communicate directly with the server 5 via the first network that includes a wifi connection with the gateway 4 and an Internet connection between the gateway 4 and the server 5. This can allow the base station 3, for example, to report conditions detected by the sensors 2 to the server 5, as well as other information such as an alarm condition determined at the location 101 by the base station 3. Where the network connection between the base station 3 and the server 5 via the first network is not operable (e.g., completely failed or transmitting at a data rate below a threshold), the base station 3 can communicate with the server 5 via another network that includes a cellular network 7. As will be understood, this other network that includes the cellular network 7 can include portions of the Internet network and other wired or non-cellular networks. This network that includes the cellular network can have a relatively small maximum bandwidth as compared to the first network, e.g., data can be transmitted at rates that are significantly lower than using the first network. In some embodiments, the network that includes the cellular network can have a maximum bandwidth that is smaller than a minimum bandwidth of the first network connection between the camera 1 and the server 5 (or between the base station 3 and the server 5). The user 6 can communicate with various components of the system 100, including the server 5 and the base station 3, using multiple different network connections including the cellular network 7, the Internet, networks including the gateway 4 (such as a wifi network at the location 101) and others.

Figure 2:
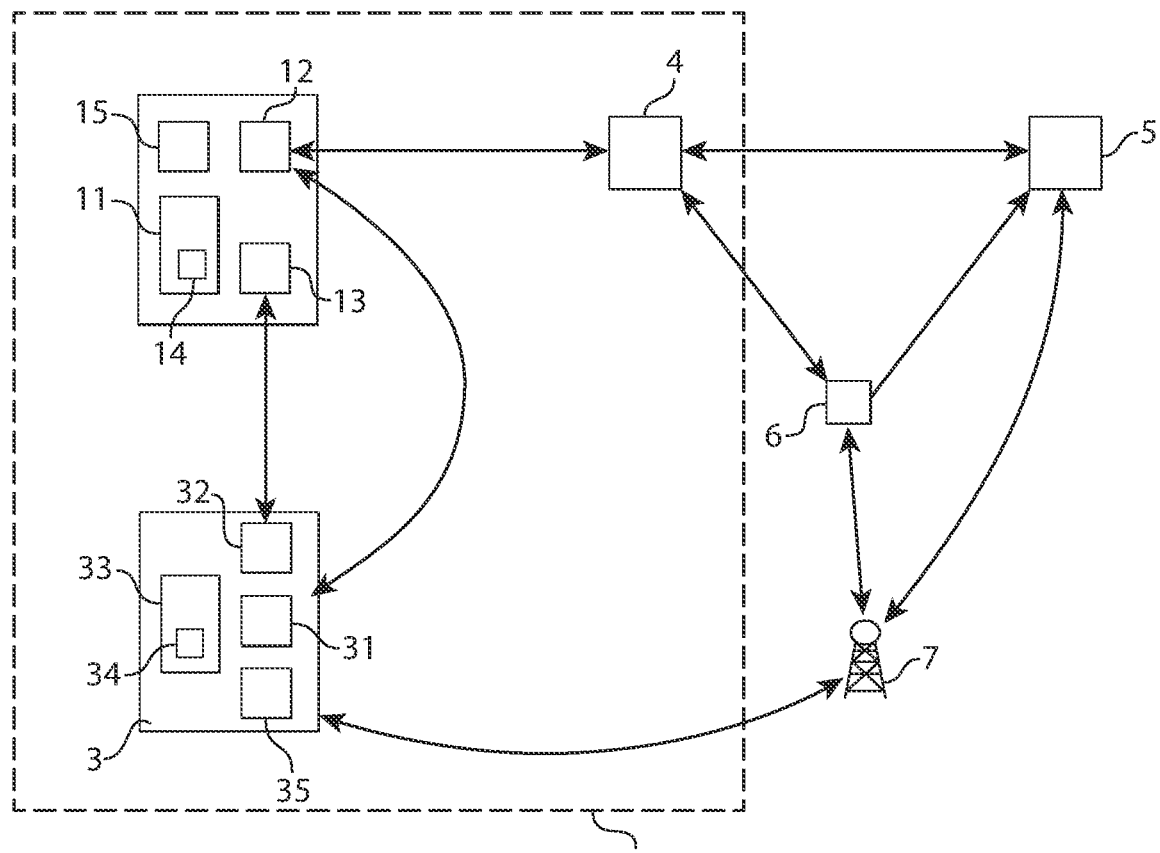
FIG. 2 is a schematic block diagram of components of the FIG. 1 system illustrating selected features and modules of the components.

FIG. 2 shows a schematic block diagram of selected components from the FIG. 1 system. In some embodiments, the camera 1 includes a controller 11, a first communications module 12 (e.g., a wifi communications module), a second communications module 13 (e.g., a sub-GHz communications module), an imager module 15 and an image processing module 14. In some embodiments, the base station 3 includes a controller 33 having an image processing module 34, a first communications module 31 (e.g., a wifi communications module), a second communications module 32 (e.g., a sub-GHz communications module), and a third communications module 35 (e.g., a cellular communications module). It should be understood that the components of the camera 1 and base station 3 shown in FIG. 2 are selected for purposes of explanation and that the camera 1 and/or base station 3 can include one or more other components for performing any suitable function. As an example, the controllers 11, 33 can include a data processing device for implementing software or other computer-implemented instructions, various sensors, indicators or other user interface components, a battery or other power supplies, voltage converters, storage devices, and other elements to perform various functions. In some embodiments, the camera 1 can include a passive infrared sensor, ultrasonic sensor or other device that can detect movement and/or the presence of various objects and a signal from such a sensor can be used by the controller 11 to activate the imager module 15 to detect image data from an area of interest, such as a field of view of the imager module 15. Such image data can be analyzed, compressed or otherwise processed by the image processing module 14 and related information stored in a memory of the controller 11, e.g., for sending to the server 5 at a current or future time. The imager module 15 can include any suitable components for capturing image data, such as lenses, filters, a CMOS or other imaging device, a microphone to capture sound data that is combined with image data to form video image data, etc. as is known in the art. The image processing module 14, 34 can include one or more software components, artificial intelligence features, or other instructions that are implemented by the controller 11, 33 to perform image analysis (such as facial recognition, movement detection, object recognition, etc.) or other processing functions (such as generating MPEG, JPEG or other image data structures, and so on).

The first communications module 12 can include a wifi communications module having one or more antennas, transceivers, a related microcontroller unit, etc. as needed to provide communications in a wifi protocol network. The second communications module 13 can include a sub-GHz communications module having suitable components for communicating in a sub-GHz protocol network or link, such as one or more antennas, related microcontroller, signal encoders/decoders, and so on. The first communications module 12 can have significantly higher power requirements than the second communications module 13, and so where the camera 1 is powered only by battery power, the controller 11 can disable the first communications module 12 as well as other camera components during periods when the camera 1 is not actively capturing, processing, sending or otherwise handling video image data. During such low power periods, only the second communications module 13 can be active, along with other components required for operation of the second communications module 13 and possibly other low power components used by the camera 1 to trigger camera operation, such as a passive infrared sensor that is used to trigger activation of the imager module 15 to capture image data when the camera 1 is in a low power mode. Thus, during low power periods, the camera 1 can be caused to activate the imager module 15 in different ways. In some embodiments, a sensor at the camera 1 such as a passive infrared sensor, can be used to trigger image capture. In some embodiments, the second communications module 13 (e.g., a sub-GHz communications module) can receive an activation signal from the base station 3 and/or a sensor 2 of the system 100 to cause activation of the imager module 15 and image capture. Upon receipt of the activation signal by the second communications module 13, the controller 11 can activate the imager module 15 and other components as needed. Sensors 2 of the system 100 can send an activation signal to the second communications module 13 of the camera 1 based on various criteria, such as detection of movement in an area of interest, detection of a door or window opening, or other conditions at the location 101. The base station 3 can send the activation signal based on various criteria, such as information received from one or more sensors 2 (opening of a door, etc.), or receipt of an activation signal by the base station 3 from the server 5 and/or user 6. An activation signal from a server 5/user 6 can be prompted for various reasons, such as a user wishes to view an area of interest, some condition detected by the server 5 at the location 101 requires activation of the camera 1 (such as inoperability of a network connection between the camera 1 and the server 5) and others.

The camera 1 can be arranged such that when the imager module 15 is activated and image data is captured, the camera 1 activates the first communications module 12 and sends the image data directly to the server 5, i.e., without routing the image data through the base station 3 or other monitoring system components at the location 101. This can enable faster transmission to the server 5, e.g., allowing a user 6 to view real-time video at the location 101, while freeing the base station 3 from handling any image data flows to the server 5. As a result, the base station 3 can be more available for its critical functions, such as detecting alarm events and notifying the server 5 of them. Where the first network connection between the camera 1 and the server 5 is inoperable, there may still be a need for at least some video image data to be transmitted to the server 5. For example, there can be an alarm condition at the location 101, such as a detected broken window or forced door opening during a failure of the first network connection, and transmission of at least one image frame (or still image) from video image data captured by the camera 1 can be useful to determine whether a person is involved with the alarm event and if so, the identity of the person. In some cases, the base station 3 may have a secret alert function where if one or more conditions at the location 101 are detected (e.g., movement around a house), the base station 3 can activate one or more cameras 1 to record and send video image data without notifying authorities or otherwise triggering an alarm state. This may allow a user to be notified of the activity at the location 101 without triggering an alarm state and attendant siren noise, notifying authorities, etc. As another alternative, each time a user 6 activates an application, the application may automatically send a request to the base station 3 (whether directly or through the server 5) to activate the camera 1, record image data and send that data to the user 6. When this occurs, the camera 1 can send at least a portion of the image data to the base station 3 (e.g., a still image), and the base station 3 can relay at least a portion of the image data to the server 5, such as by a network connection that includes the cellular network 7. (The base station 3 could use a network connection that includes the gateway 4 if, for example, the network connection between the camera 1 and the gateway 4 is disrupted, such as by interference rather than employing the cellular network 7.)

Image data can be sent from the camera 1 to the base station in different ways. For example, the camera 1 can detect that a connection to the server 5 is inoperable and send a request via the first communications module 12 or the second communications module 13 that the base station 3 operate as a wifi access point. A wifi network connection can then be established between the first communication module 12 of the camera 1 and the base station 3 (e.g., via a wifi communications module 31 in the base station 3), and image data sent from the camera 1 to the base station 3. Alternately, the camera 1 can send image data to the base station 3 using the second communications module 13 (e.g., the sub-GHz communications module). In this case, a sub-GHz communications module 32 or other module at the base station 3 that operates according to the protocol used by the second communications module 13 of the camera 1 can establish a suitable communications network or link with the camera 1 to receive the image data. Note as well that while the camera 1 can initiate the establishment of a network connection or link between the camera 1 and base station 3 when a network between the camera 1 and server is inoperable, the base station 3 can do so as well, either at its own prompting or in response to receipt of a suitable signal from the server 5 or user 6. For example, the server 5 can detect a failure of a communications network connection with the camera 1 and send a signal to the base station 3 indicating the failure of the connection and requesting the first communications module 31 of the base station 3 act as a wifi access point or that the base station 3 otherwise establish a communications link with the camera 1 to receive image data from the camera 1. Once image data is received by the base station 3, the base station 3 can send the image data, or a portion of it, to the server 5 via any suitable network connection, such as by using a cellular network module 35 and a network connection that includes the cellular network 7.

As noted above, either a communications link between the camera 1 and the base station 3 for sending image data, or a network connection between the base station 3 and the server 5 can have a relatively small maximum bandwidth or other ability to send large amounts of data in a rapid fashion. In such case, a portion of the video image data can be selected for sending from the camera 1 to the base station 3 and/or from the base station 3 to the server 5. In some embodiments, the camera 1 can select a portion of the video image data for sending to the base station 3 based on analysis of the image data. As an example, the image processing module 14 can identify one or more image frames that include a recognizable or recognized face, and send that selected image frame to the base station 3. Image frame(s) can be selected in other ways, such as by identifying frames that have a person, animal, pet, object, text, or some other feature that would make the image useful. In some embodiments, audio data that is part of the video image data can be used to select one or more image frames, such as a set of images corresponding to a time during which glass breakage is detected, or when a person is heard talking. Thus, the camera 1 can be able to send useful video image data to the base station 3 even when sending the information via a relatively low bandwidth connection, such as on a sub-GHz and/or cellular network connection. In other embodiments, the base station 3 can select one or more image frames from video data received from the camera 1, e.g., using the image processing module 34, whether the camera 1 has sent a full set of image frames or sent a selected set of images to the base station. The image processing module 34 of the base station 3 can use image analysis or any other suitable technique to identify portions of video image data for sending to the server 5.

Figure 3:
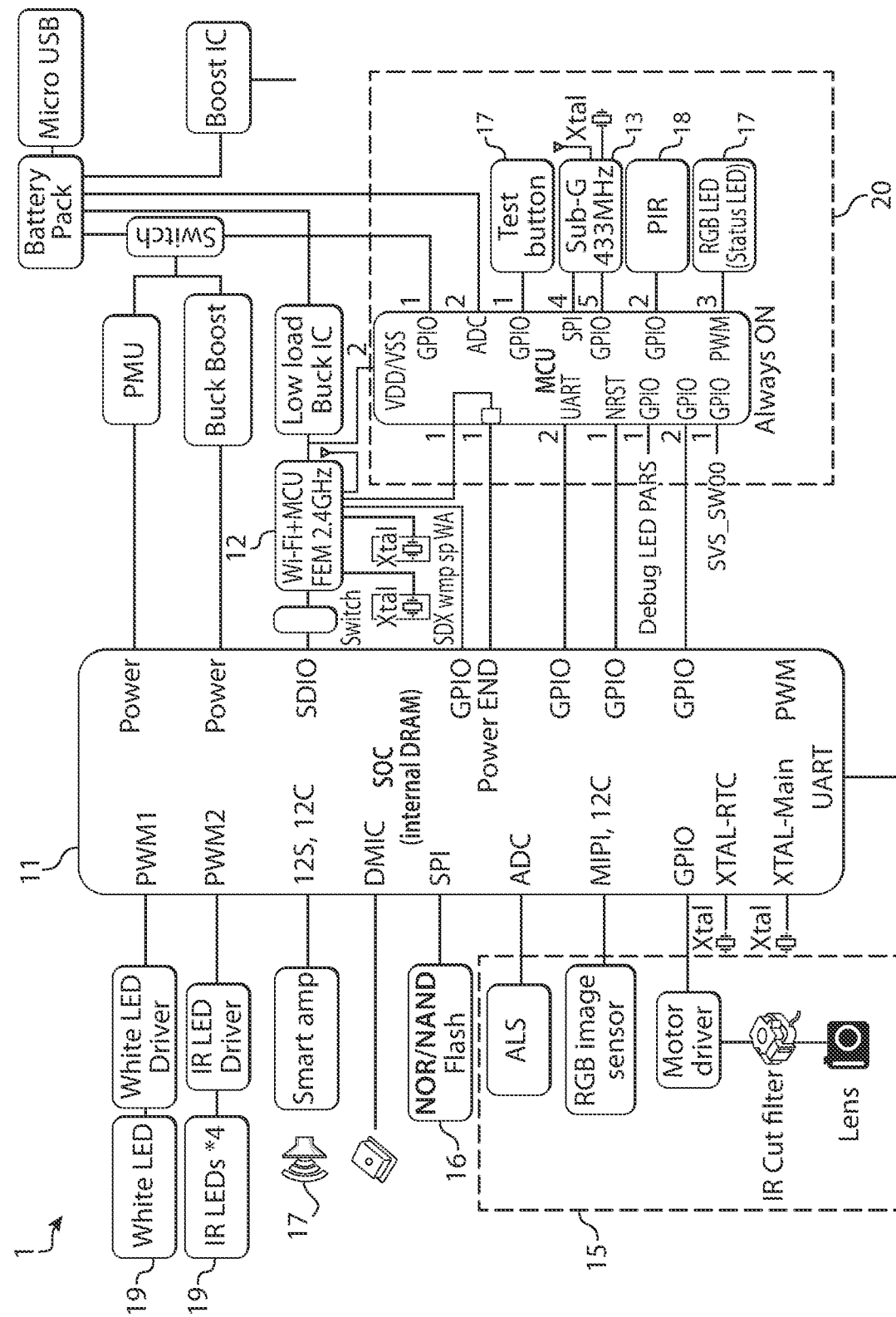
FIG. 3 is a schematic block diagram of selected components for a wireless camera.

FIG. 3 shows a schematic block diagram of selected components for an example wireless camera 1. In some embodiments, the controller 11 can include a system on a chip (SOC) data processor or computing device that implements software and other instructions, e.g., stored in a memory 16 or elsewhere, to perform various control and other functions, including functions of the image processing module 14. The controller 11 can also include various user interface components 17 such as status LEDs or other indicators, buttons, switches or other user input devices, a speaker or microphone to output or receive input regarding audible sound, and so on. The controller 11 in some embodiments can include a battery or other power supply, a power management unit (PMU) for adjusting voltage, current and/or other aspects of power provided to various components of the camera 1, and any other suitable components for performing input/output, control or other functions. In some embodiments, the imager module 15 can include an image sensor, one or more filters (such as an IR cut filter shown in FIG. 3), optical lens, a motor or other drive to control lens focusing or other operations, a light sensor or other exposure control system (ALS), and other components. As an example, the camera 1 can include infrared and/or visible light LEDs or other light emitters 19 that can help illuminate an area for imaging purposes, such as illumination light, ranging or other distance determination, focusing operations, and so on. In some cases, light emitters 19 can be used to illuminate an area near the camera 1 without imaging taking place, e.g., the camera 1 can operate as a spot light.

As described above, the camera 1 can have some components that are always active or powered with electrical energy, and other components that are deactivated or not powered when not needed. In some embodiments, the camera 1 can include an always on circuit 20 that includes components that are always activated, even during low power modes of the camera 1. Other portions of the camera 1 (e.g., an activation circuit) can be in a sleep or low power mode and can be activated or turned on to put the camera in an operational mode, e.g., when the always on circuit 20 receives an activation signal. In some embodiments, the controller 11 can include a microcontroller unit (MCU) that is part of the always on circuit 20 and is capable of performing a limited number of functions needed to control, act on and/or receive input from components of the always on circuit 20, as well as cause other portions of the controller 11 to be activated when necessary to exit the low power mode. In some embodiments, the always on circuit 20 can include a sub-GHz communications module 13 or other low power communications module that is active to receive communications from the base station 3 or elsewhere, e.g., to cause activation of the camera 1 to record image data. In some cases, a passive infrared sensor (PIR) or other sensor 18 can be included with the always on circuit 20 to detect motion or other conditions to cause the camera 1 to activate the imaging module 15 to capture image data. As an example, the PIR sensor 18 can detect the presence of people or motion in a field of view of the camera 1 and provide a suitable signal to the MCU to cause the controller 11 to activate the imaging module 15 and capture video image data.

In some embodiments, while the camera 1 is in a low power mode and all components except for the always on circuit 20 are deactivated, the camera 1 can detect motion or other indication that video image data should be recorded, e.g., using the PIR sensor 18, which causes the controller 11 to activate the imaging module 15 to record video image data and the wifi communications module 12 to establish a network with the gateway 4 and the server 5 for sending the video image data. Alternately, the camera 1 can detect an indication that video image data should be captured by receiving a signal via the sub-GHz communications module 13, which also causes activation of the imaging module 15 and wifi module 12. Such a signal can be sent by the base station 3, whether in response to a condition sensed by a sensor 2, a signal sent by the server 5, or a request from a user 6 to activate the camera 1 for some reason. As an example, when the base station 3 (e.g., in response to data from a sensor 2) detects that there is a person or other detected condition at the location 101, the base station 3 can send a notification to the user 6. In response, the user 6 can click the notification, which causes the user 6 to send a request to the base station 3 for an image of the area where the person or other condition was detected. This can cause the base station 3 to activate the camera 1 via the sub-GHz communication link to activate, capture an image and send the image to the base station 3 (e.g., via the wifi module with the base station 3 acting as an access point) for forwarding to the user 6 (e.g., via the cellular network 7). Alternately, the camera 1 can send the image directly to the server 5 which can relay the image to the user 6. In some embodiments where the monitoring system 100 includes multiple cameras 1, the base station 3 can send a single activation signal (e.g., via the sub-GHz module) that is received by all cameras 1 in the system and causes all of the cameras 1 to activate and record image data. In some cases, the camera 1 can perform image analysis on the video image data and select an appropriate image (e.g., one including a visible face) for sending to the user 6. With a network connection to the server 5 established, the camera 1 can send the image data to the server 5. However, if the camera 1 cannot send the image data to the server 5, the camera 1 can store the image data in a memory 16 to later sending to the server 5 and/or for sending to the base station 3 via the wifi module 12 or the sub-GHz module 13.

While example implementations described herein have generally been depicted in the context of wireless cameras, other embodiments are possible, and the beneficial systems and methods herein can be implemented in a variety of other devices that process and transmit data to connected devices, such as tablets, mobile devices, video gaming systems, communication devices, computer peripherals, audio equipment, etc. Additionally, while some example devices described herein are referred to as wireless, this is not intended to limit the claimed scope to require that no wires can be used to connect the devices to other things. For example, in some cases, some of the techniques and approaches described herein can be implemented in or with devices that receive power by a wired connection but transmit data wirelessly.

Figure 4:
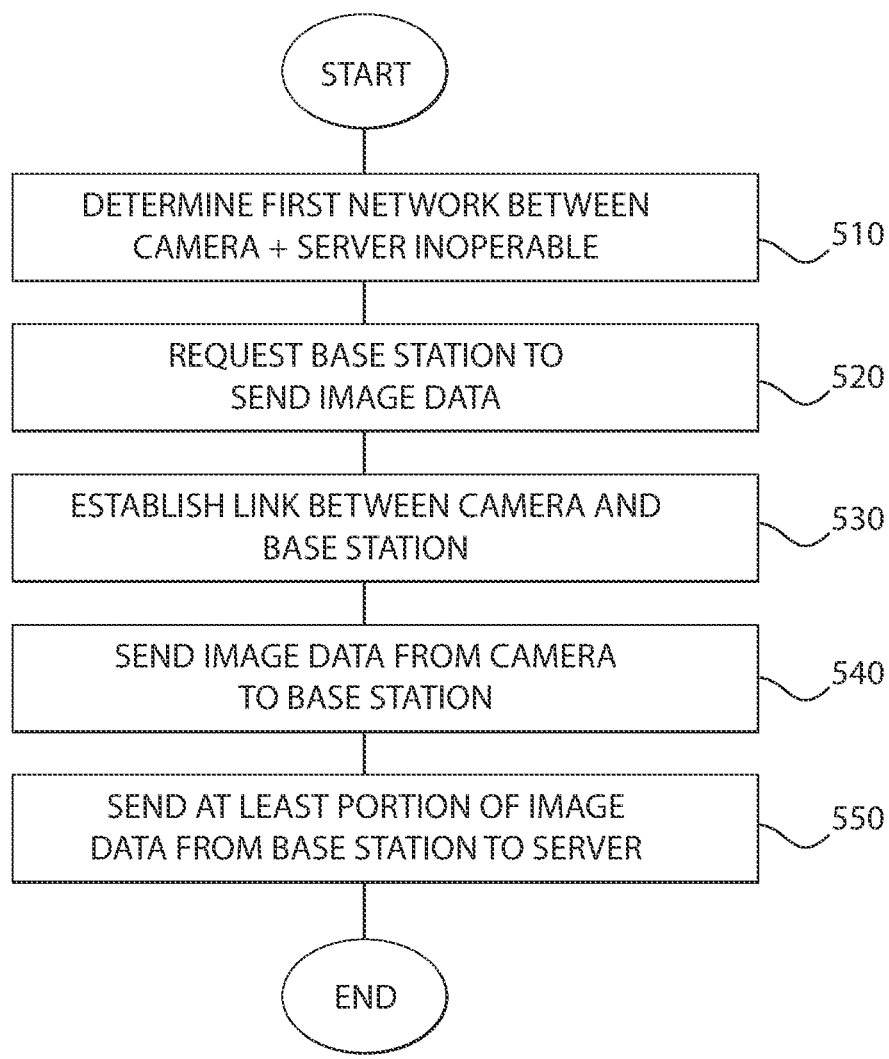
FIG. 4 is a flow chart of steps in a method for managing image data transfer from a wireless camera to a remote server.

FIG. 4 is a diagrammatic flow chart depicting an example method for sending image data from a monitored location to a server of a location monitoring system, such as those described herein in association with FIGS. 1-3. In step S10, a determination is made that a first network connection between a camera and a server is inoperable. The first network connection is direct between the camera and the server, meaning that data between the camera and router is not routed through a base station or other monitoring system component at a monitored location other than a gateway that provides a connection to the Internet or other wide area network. The first network connection can include a wifi network connection between the camera and the gateway, and so can include a wireless local area network connection between the camera and the gateway. As an example, the first network connection can be between the first communications module 12 and the server 5 and include a wifi connection between the first communication module 12 and the gateway 4, and between the gateway 4 and the server 5. An inoperable connection is one that has a completely failed link or network portion that entirely prevents the sending of data from the camera to the server, or one that operates to send data at a rate that is below a threshold. As an example, a wifi connection between the first communications module 12 and the gateway 4 could fail or degrade, or the connection between the gateway 4 and the server 5 could fail or degrade. This determination of an inoperable first network connection can be made by the camera, e.g., by the first communication module 12 failing to receive proper acknowledgement or other signals confirming a suitable network connection is established or being maintained between the camera 1 and the server 5, or receiving an indication at the first communication module 12 and/or base station 3 that data transmission is occurring below the threshold rate. Alternately, the determination can be made by the server 5, e.g., by the server 5 detecting that data is not being received from the first communication module 12 of the camera 1 or being received at a rate below the threshold. The determination of an inoperable first network connection can be made before any video image data is sent from the camera to the server, or after at least some video image data is sent.

In step S20, a request is made of the base station to send image data from the camera to the server. This request can be made in different ways. For example, the camera (e.g., the second communications module 13) can send a request to the base station (e.g., via a sub-GHz link) that the base station act as a wifi access point and forward image data to the server. This request can be made using a same communications protocol used by the camera to send image data directly to the server, e.g., a wifi protocol request sent by the first communication module 12 to the base station 3 which can cause the first communication module 31 of the base station 3 to act as a wifi access point for the camera. Alternately, the camera can send the request via a different communications protocol (e.g., the second communication module 13 using a sub-GHz protocol communication) to the base station 3 (which receives using the second communications module 32). In some embodiments, the server 5 or user 6 can send a request to the base station 3 to send image data from the camera 1, and any suitable communications network or combination of network connections can be used to send the request, e.g., including a cellular network 7, the Internet, a wifi network using the gateway 4, etc. Thus, the base station can receive a message to send image data from the camera to the server. In some embodiments, the message sent to the base station or received by the base station can be a request for the base station to operate in a back-up cellular mode where image data from the camera is sent from the base station to the server by a network connection that includes a cellular network 7.

In step S30, a communications link is established between the camera and the base station. Again, this can be done in different ways. In some embodiments, the base station can act as a wifi access point (e.g., using the first communications module 31) and establish a wifi network connection between the camera and the base station (e.g., with the camera 1 using the first communications module 12). In this case, the base station 3 and camera 1 will send and receive appropriate messages between them using a wifi protocol to establish the wifi connection. Operation of the base station as a wifi access point can be done in response to a request received by the base station from the camera, e.g., using a wifi protocol, sub-GHz protocol or other communications link, or in response to a request received by the base station from the server 5/user 6. In some embodiments, the camera and base station can establish a sub-GHz communication network or link according to a sub-GHz communication protocol (e.g., using the second communications modules 13, 32) for sending and receiving video image data or portions thereof. Other network connections or communications links between the camera and base station can be established, however, and suitable communications between the camera and base station can used to establish the corresponding connection.

In step S40, image data is sent from the camera to the base station using the established communications link. Accordingly, this step can include sending image data from the camera (e.g., using the first communications module 12), as well as receiving image data at the base station (e.g., using the first communications module 31). The image data sent can be streaming live video image data including visible image and audio data, or can be a portion of video image data captured by the camera (e.g., using the imaging module 15). A portion of video image data can be one or more selected image frames or still images that are part of the video image data (e.g., as selected by the image processing module 14), or portions of audio data that is part of the video image data (e.g., as selected by the image processing module 14). As will be understood, such image data can be compressed or formatted in any suitable way (e.g., by the image processing module 14 to reduce the overall bit size of the image data). In some embodiments, the camera can select one or more image frames or still images from video image data for sending to the base station (e.g., using an artificial intelligence or other image analysis processing at the image processing module 14). This approach can provide advantages where the communications link between the camera and the base station has a relatively low bandwidth capable of sending data at a relatively slow rate, e.g., a sub-GHz communication link. The camera can select one or more image frames using image analysis, e.g., using the image processing module 14 to identify a frame including a person, a person's face, animal, object or other feature of interest.

In step S50, at least a portion of the image data is sent from the base station to the server. The base station can send all of the image data received from the camera to the server (e.g., using a cellular communications module 35, first communications module 31 or other), or can select a portion of image data received from the camera to the server (e.g., using the image processing module 34). As is the case with the camera, the base station can select one or more image frames from video data using image analysis or any other suitable technique (e.g., artificial intelligence or other software-based image analysis). The base station can send the portion of the video image data, whether one or more image frames, audio data, combinations of image frame and audio data, etc., using any suitable network connection, such as a network connection that includes a cellular network 7 (e.g., using the cellular communications module 35). As will be understood, use of a cellular network can involve use of one or more other communications networks, such as the Internet or other wide area network, to complete a network connection to the server. Where the base station is requested to act in a cellular back-up mode (e.g. by the camera 1, server 5 or user 6), the base station can be required to send the video data from the base station using a cellular network 7, but once the cellular network receives the image data, the image data can be sent to the server 5 using other networks.

Figure 5:
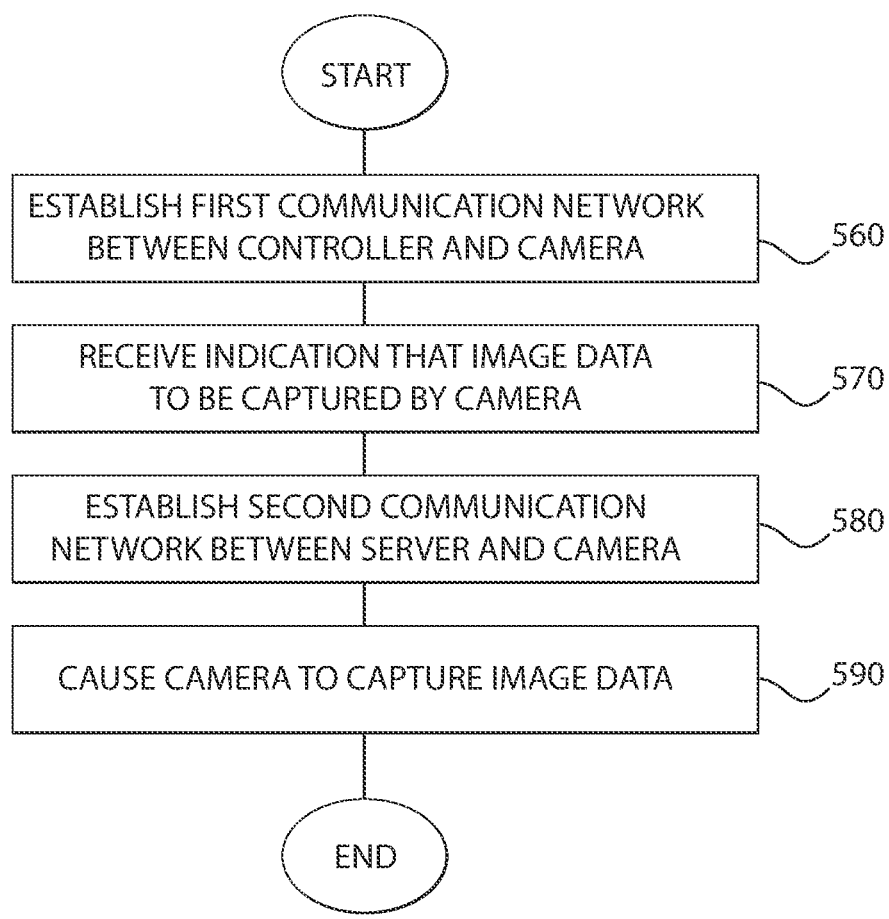
FIG. 5 is a flow chart of steps in a method for managing wireless camera power and image data transfer.

FIG. 5 is a diagrammatic flow chart depicting an example method for controlling a camera, e.g., used in a location monitoring system. In step S60, a first communication network is established between a controller and a camera (e.g., using respective wifi communication modules 12, 31). In some embodiments, a controller can be a base station 3 at the location that communicates with various sensors of the monitoring system 100, such as door and window sensors, cameras, water sensors, smoke and fire sensors, etc., that detects an alarm condition at the location (or otherwise detects or receives inquiry or instruction to turn on a camera to obtain image data for a user, which can include a user accessing an app or web browser to view image data), and that communicates with a remote server regarding alarm conditions and other conditions at the location. The camera can be a wireless, battery-powered camera 1 that is used to capture video image data (e.g., using an imaging module 15) regarding an area of interest at the location, such as an area near a door of a house. The first communication network can be any suitable network, such as sub-GHz communications link or wifi connection between the controller and camera (e.g., where the camera 1 and base station 3 employ suitable communications modules 12, 13, 31, 32). In some embodiments, a low power communications link such as a sub-GHz protocol network can provide advantages because the camera can have all or nearly all other components of the camera deactivated other than the sub-GHz communications module (e.g., components that are part of a continuously connected or otherwise activated (e.g., an always-on) circuit 20) and yet still communicate with the controller. This can help the camera conserve battery power, and so increase battery life or time between required charging, while still allowing the controller to communicate with the camera and activate the camera to capture image data during its low power mode. Where a camera has two communications modules, one a relatively high power module (e.g., a wifi communications module 12) and the other a relatively low power module (e.g., a sub-GHz communications module 13), the camera can maintain the high power communications module in a deactivated state while a communications network is established between the camera and base station using the low power communications module. For example, a camera can maintain a wifi communications module 12 in a deactivated state while a sub-GHz communications module 13 remains active for communication and establishes a communication network with the base station.

In step S70, an indication is received that image data is to be captured by the camera at an area of interest. This step can involve receiving a signal at the base station that there is activity within an area of interest of the camera or otherwise that the camera should capture image data. As an example, the base station can receive a message from a sensor 2, remote server 5 or user 6 that the camera should start recording image data. In some embodiments, the base station can receive a signal from one or more sensors 2 at the monitored location that some event has occurred (e.g., movement, a loud noise, etc.) and indicates that there can be activity at the area of interest and the camera should record video image data. In some embodiments, the base station 3 can be in an armed state in which information from some sensors 2 can cause the base station 3 to determine alarm state is present (e.g., a sensor 2 that detects breaking glass). In these embodiments, receipt by the base station 3 of the sensor 2 information can be receipt of a signal indicating that the camera 1 (or multiple cameras at the location 101) should capture image data. In some embodiments, the base station 3 can receive a signal from a user 6 in response to the user 6 opening an app or otherwise indicating that the user 6 wishes to receive image data from one or more cameras 1. This message can be received by any communications network, including wifi, Internet, cellular or other networks. Receipt of such a message by the base station can cause the base station to cause step S60 to be performed, e.g., by sending a signal to the camera to establish the first communication network. This can be done by the base station using the second communications module 32, e.g., using a sub-GHz protocol, to send a message that is received by the second communications module 13 of the camera 1. This message as received by the second communications module 13 can be receipt of an indication that image data is to be captured by the camera 1, and cause the camera 1 to perform step S60 (e.g., by establishing a wifi network connection with the gateway 4 and server 5 using the first communications module 12). Thus, this step S70 can also include receiving at the camera an activation signal that the camera should capture image data. This activation signal can be received by the camera while the camera is in a low power mode (e.g., using a sub-GHz communications module 13) and has the imager module 15 and other components such as a high power communications module (e.g., wifi module 12) deactivated. Thus, the camera can receive the activation signal via the first communications network, and can do so while maintaining a second communications network device (such as a wifi module) deactivated or in a disabled state.

In step S80, a second communication network between the camera and the server is established. This can be done by the camera in response to receiving an activation signal from the base station, e.g., via the first communications network (e.g., via the sub-GHz module 13), which causes the camera to activate a second communication network device (e.g., the wifi module 12) and establish a second network connection (e.g., a wifi connection) with a gateway 4 or other device that provides a connection to the server 5. Thus, this step S80 can involve the base station sending a signal to the camera commanding the camera to establish the second communication network with the server, and this signal sent by the base station can be an activation signal that is received by the camera while the second network communication device is disabled. The second communication network can allow direct communication between the camera and the server, e.g., such that data is not routed through the controller. As an example, the first communications module 12 of the camera 1 can send video image data directly to the server 5 without routing the data through the base station 3.

In step S90, the camera is caused to capture image data. This step S90 can involve the base station sending a signal to the camera, e.g., via the first network connection (e.g., a sub-GHz connection), that the camera should start capturing image data. In some embodiments, the camera can begin capturing image data (e.g., using the imaging module 15) in response to establishing the second communication network with the server (e.g., using the wifi module 12), e.g., because with the second network connection established, the camera can send video image data directly to the server 5. In either case, this step S90 can include the camera turning on an imaging device of the camera to capture image data of the area of interest.

While systems and methods have been described with reference to various illustrative embodiments, such systems and methods are not limited to the embodiments described. Thus, it is evident that many alternatives, modifications, and variations of the embodiments described will be apparent to those skilled in the art. Accordingly, embodiments as set forth herein are intended to be illustrative, not limiting.

The invention claimed is:

1. A system comprising:
a camera configured to acquire image data and including:
first and second wireless transceivers configured to establish first and second wireless communications networks, respectively, the first wireless communication network being with a server; and
a base station including:
a third wireless transceiver configured to establish the second wireless communications network between the camera and the base station via the second wireless transceiver, so as enable transfer of at least a portion of the image data from the camera to the base station, and
a cellular communications device configured to establish communications with the server so as to enable transmission of at least a portion of the image data from the base station to the server.

2. The system of claim 1, wherein the second wireless communications network is a sub-GHz communications network.

3. The system of claim 1, wherein to establish the second wireless communications network, the camera is configured to send a message to the base station using one of the first wireless transceiver or the second wireless transceiver.

4. The system of claim 1, wherein the image data includes a plurality of image frames, and wherein the portion of the image data transferred from the camera to the base station includes one or more selected image frames from the image data, at least one of the one or more selected image frames including a visible face.

5. The system of claim 4, wherein the camera is configured to select the one or more selected image frames from the image data based on analysis of the image data to identify the visible face.

6. The system of claim 1, wherein the base station is configured to activate the camera to acquire the image data based on a user instruction indicating that the image data is to be acquired.

7. The system of claim 1, wherein the first wireless transceiver has higher operating power than the second wireless transceiver.

8. The system of claim 1, wherein the first wireless transceiver is configured to enter a sleep mode, and the second wireless transceiver is configured to communicate with the base station when the first communications wireless transceiver is in the sleep mode.

9. A location monitoring system comprising:
a battery-operated camera disposed at a monitored location and configured to acquire image data at the monitored location, the camera including:
a first camera communications device configured to establish a first communications connection with a server via a first wireless network, the server being located remote from the monitored location and the first communications connection having a first minimum bandwidth, and
a second camera communications device configured to communicate over a second wireless network; and
a base station disposed at the monitored location, the base station including:
a first base station communications device configured to establish a second communications connection with the camera via the second wireless network, and
a second base station communications device configured to establish a third communications connection with the server via a third communications network;
wherein the base station and the camera are configured such that that when the first communications connection is inoperable such that the image data cannot be sent from the camera to the server via the first communications connection, the second and third communications connections are established and at least a portion of the image data is sent from the camera to the base station via the second communications connection and from the base station to the server via the third communications connection.

10. The location monitoring system of claim 9, wherein the image data includes a plurality of image frames, and wherein the portion of the image data sent from the camera to the base station includes one or more selected image frames from the plurality of image frames, wherein the one or more selected images frames includes at least one image frame including a visible face.

11. The location monitoring system of claim 9, wherein the second communications connection is a sub-GHz communications connection.

12. The location monitoring system of claim 9, wherein the third communications network is a cellular telephone network.

13. The location monitoring system of claim 9, wherein the third communications network has a maximum bandwidth that is smaller than the first minimum bandwidth.

14. The location monitoring system of claim 9, wherein the base station is configured to activate the camera to acquire the image data based on a user instruction indicating that the image data is to be acquired.

15. A camera comprising:
a memory; and
a processor coupled to the memory and configured to:
  determine that a first communications network of the camera is inoperable to send video data from the camera to a server based on a data transmission rate of at least a portion of the first communications network being below a threshold,
  based on a determination that a first communications network is inoperable, establish a second communications network between the camera and a base station, and
  transfer at least a portion of the video data from the camera to the base station via the second communications network so as to bypass the first communications network and indirectly send at least the portion of the video data to the server via the base station.

16. The camera of claim 15, wherein the video data includes a plurality of image frames, wherein the portion of the video data sent from the camera to the base station includes one or more selected image frames from the plurality of image frames, and wherein the one or more selected images frames includes at least one image frame including a visible face.

17. The camera of claim 15, further comprising:
  a wireless transceiver configured to establish the first communications network;
  wherein the second communications network is a WI-FI network with the base station acting as a WI-FI access point; and
  wherein the camera is configured to establish the second communications network using wireless transceiver.

18. The camera of claim 15, wherein the second communications network is a sub-GHz communication network, the camera further comprising:
  a sub-GHz wireless transceiver configured to establish the sub-GHz communications network between the camera and the base station.

19. The camera of claim 15, wherein the camera is configured to activate one or more image sensors to acquire the video data based on a user instruction.

20. The camera of claim 19, wherein the camera is configured to activate the one or more image sensors to acquire the video data for a predetermined time duration.

* * * * *